United States Patent
Allison et al.

[15] 3,675,104
[45] July 4, 1972

[54] SINGLE-PHASE FULL-WAVE REGENERATIVE SCR SHUNT MOTOR CONTROL SYSTEM

[72] Inventors: Arthur F. Allison, West Bend; Donald J. Greening, Thiensville; Anton N. Mollgaard, Pewaukee, all of Wis.

[73] Assignee: Cutler-Hammer, Inc., Milwaukee, Wis.

[22] Filed: Dec. 17, 1970

[21] Appl. No.: 99,065

[52] U.S. Cl. .................................................. 318/345
[51] Int. Cl. .............................................. H02p 5/16
[58] Field of Search .................................... 318/345

[56] References Cited

UNITED STATES PATENTS

| 3,538,404 | 11/1970 | Risberg | 318/345 |
| 3,284,688 | 11/1966 | Black | 318/345 |
| 3,486,102 | 12/1969 | Wilkerson | 318/345 |
| 3,538,412 | 11/1970 | Graf | 318/345 |
| 3,555,386 | 1/1971 | Wisman | 318/345 |

Primary Examiner—Bernard A. Gilheany
Assistant Examiner—Thomas Langer
Attorney—Hugh R. Rather and William A. Autio

[57] ABSTRACT

A single-phase full-wave regenerative SCR (silicon controlled rectifier) drive having a series and shunt, T-network, reactor configuration, minimum firing of both forward and regenerative SCR's, and current feedback regulation. The reactor configuration along with the controlled minimum firing angle assures continuous current through the motor armature over substantially the entire load range except for the low 10 to 20 percent whereas normally continuous current occurred only in about the upper half of the load range. This allows the current regulator to be designated for continuous current rather than discontinuous current, having higher gain, and affording better control. By continuous current, heating also is reduced.

10 Claims, 10 Drawing Figures

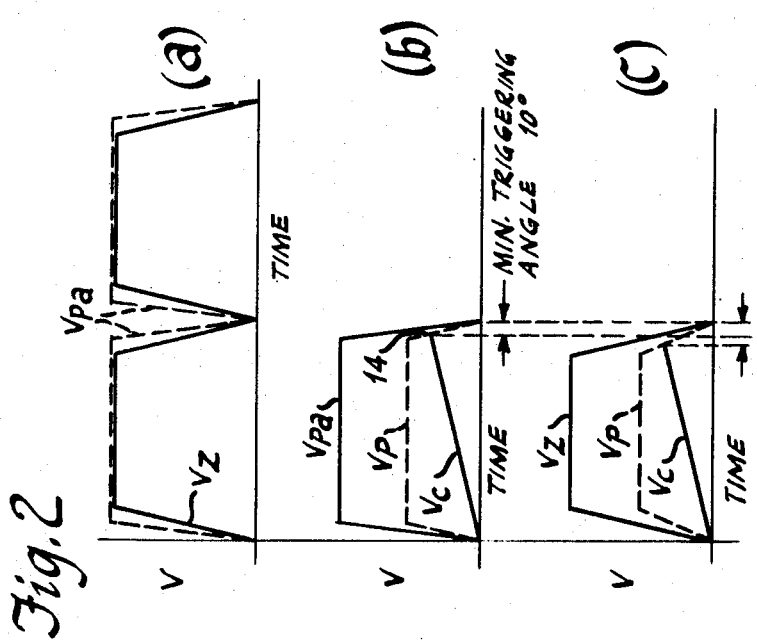

SINGLE-PHASE FULL-WAVE REGENERATIVE SCR SHUNT MOTOR CONTROL SYSTEM

CROSS-REFERENCE TO RELATED APPLICATIONS

Our copending applications, Ser. No. 98,998 filed Dec. 17, 1970, and Ser. No. 99,166 filed Dec. 17, 1971, claim the unijunction recovery circuit and the increased minimum firing angle circuit, respectively, that are used in this system.

BACKGROUND OF THE INVENTION

Single-phase full-wave regenerative drives and three-phase regenerative drives have been known heretofore along with their performance curves such as curves A and B in FIG. 6. In single-phase drives, voltage regulation has been the obvious thing to use even though it has been known that in such voltage or speed regulation any disturbance will affect it. Current regulation has not been preferred probably because of the problems inherent therein due to the greatly discontinuous current in a single-phase regenerative system. Such single-phase system represents the worse case insofar as current discontinuity is concerned. Three-phase systems, while substantially better than single-phase systems from the current discontinuity standpoint, also have disadvantages in that the torque is not controllable over a substantial area of its regenerative speed-torque range.

Consequently, it has become desirable to provide a high performance drive that does not have the above disadvantages and to do it in a single-phase drive.

SUMMARY OF THE INVENTION

This invention relates to a single-phase full-wave regenerative SCR shunt motor control system.

A general object of the invention is to provide a high performance drive of the above type.

A more specific object of the invention is to provide a single-phase full-wave regenerative motor control system with improved means affording control of the torque to zero value throughout its whole speed range.

Another specific object of the invention is to provide a motor control system of the aforesaid type with improved means affording very fast current regulation.

Another specific object of the invention is to provide a motor control system of the aforesaid type with improved means affording continuous current through substantially its whole operating range, without allowing discontinuous current to occur beyond a tolerable range for a continuous current regulator.

Another specific object of the invention is to provide a single-phase full-wave regenerative SCR drive that affords better performance and a substantial reduction in cost in eliminating sensing circuits by minimum firing of both the motoring and regenerative SCR's.

Other objects and advantages of the invention will hereinafter appear.

BRIEF DESCRIPTION OF THE DRAWINGS

FIG. 2 graphically compares the wave form of the UJT pulse generator of FIG. 1b with a prior art wave form and illustrates how the increased minimum triggering angle is obtained;

FIG. 3 is a graph showing the speed-torque characteristics under forward running conditions of the motor and the nature of the improvement attained therein by the current compensation feedback incorporated in the system of FIG. 1a–b;

FIG. 4 is a graph showing an unwanted "shoot-through" regenerative condition that is prevented by the invention;

FIG. 5 is a graph showing how the unwanted "shoot-through" condition of FIG. 4 is prevented;

FIG. 6 is a graph showing the improvement in the regenerative speed-torque characteristics of the invention over prior art systems;

FIG. 7 is a schematic diagram of the motor power circuit of FIG. 1a;

FIG. 8 is a chart of curves showing voltage and current characteristics of the invention; and FIG. 9 is a graph showing the gain characteristics of the invention.

DESCRIPTION OF THE PREFERRED EMBODIMENT

Figure 1A:
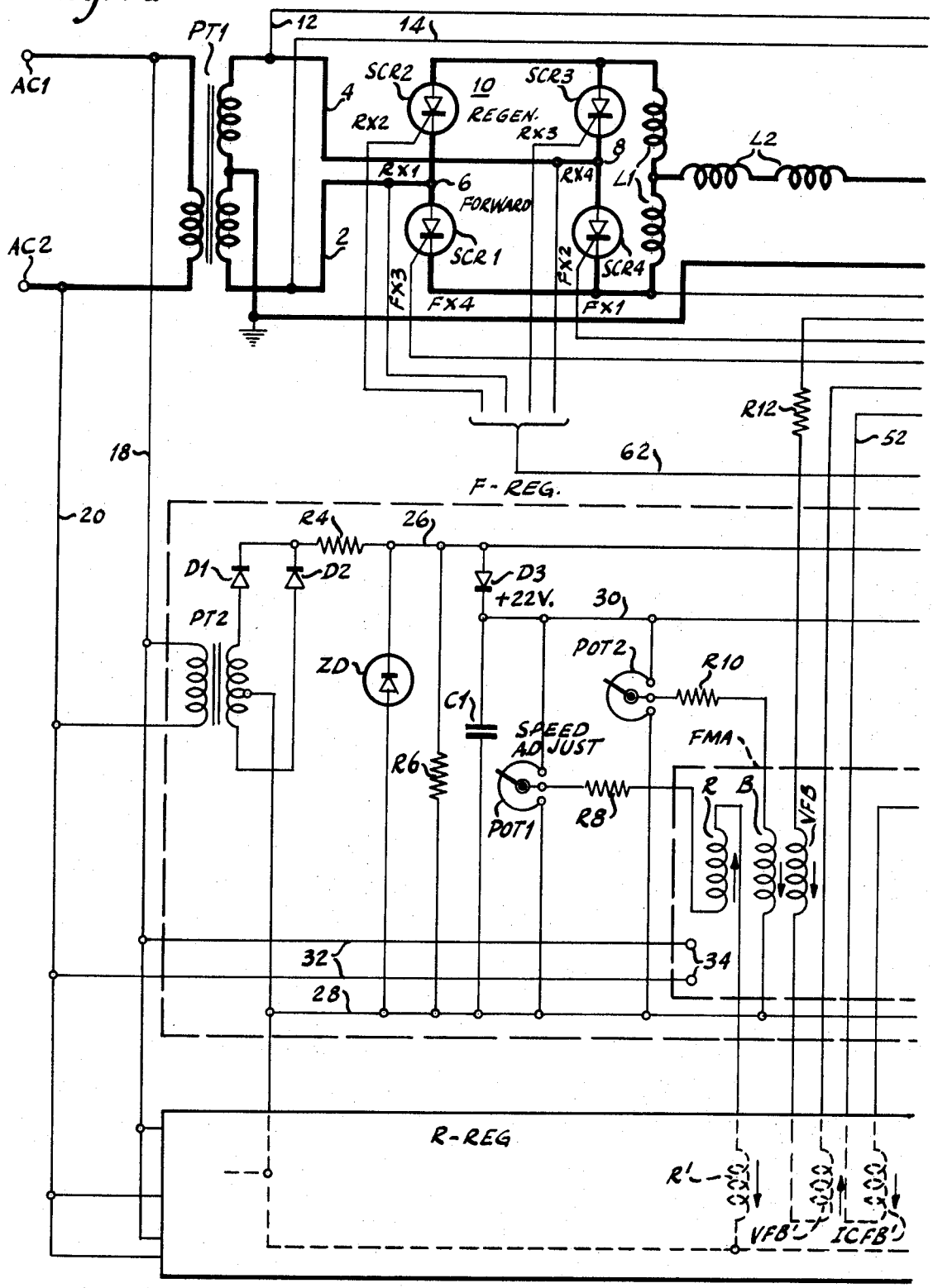
FIGS. 1a and 1b show a schematic circuit diagram of a single-phase full-wave regenerative SCR shunt motor control system constructed in accordance with the invention.
Figure 1B:
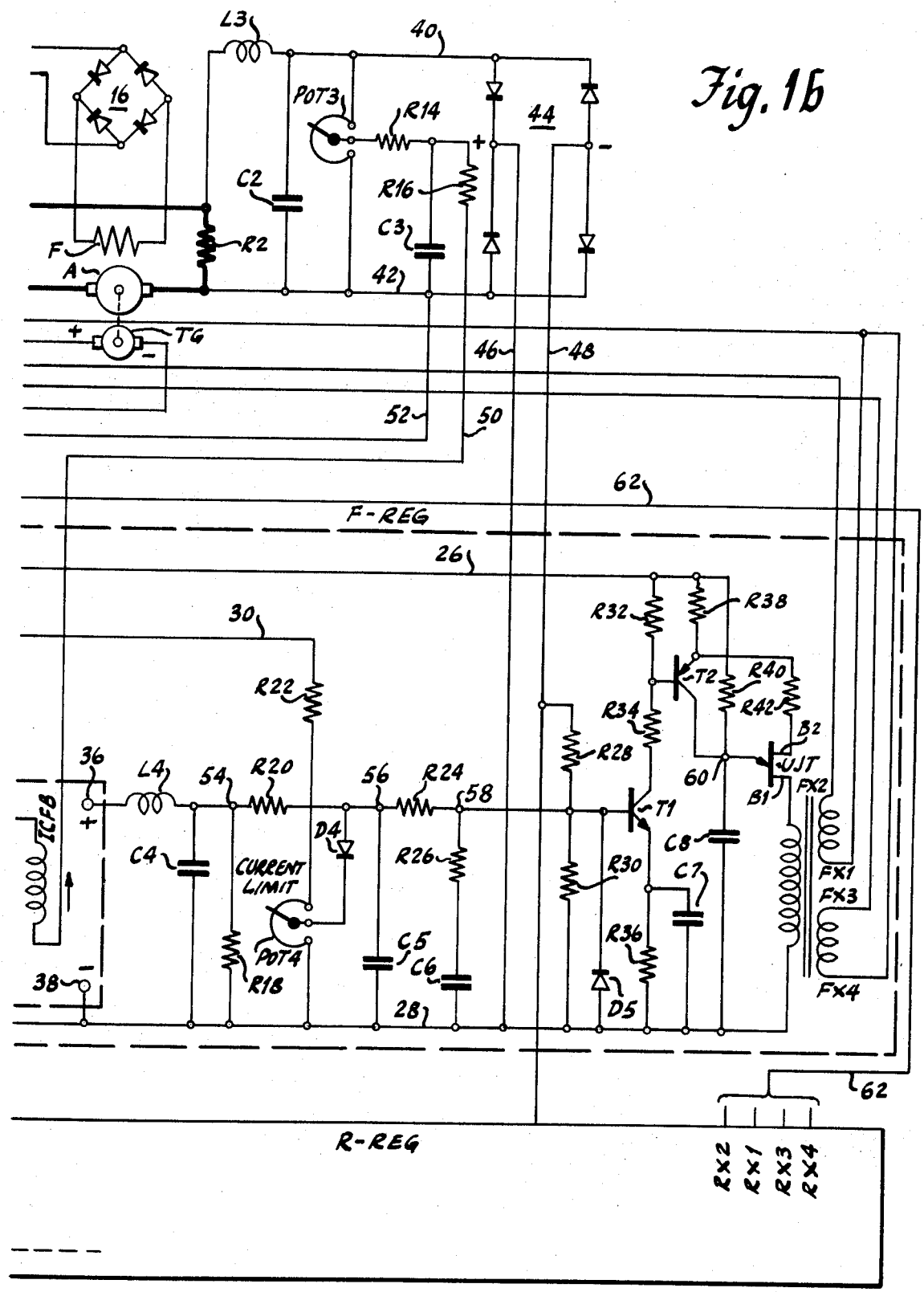

Referring to FIG. 1a–b, there is shown a single-phase full-wave regenerative SCR drive system constructed in accordance with the invention. The system is supplied from a 440 volt A.C. source or the like adapted to be connected to alternating current supply terminals AC1 and AC2. These supply terminals are connected across the primary winding of a voltage transformer PT1 whose center-tapped secondary winding is connected at its opposite ends through conductors 2 and 4 to the input terminals 6 and 8 of a forward-regenerative SCR (silicon controlled rectifier) network 10.

Network 10 comprises four SCR's including forward SCR1 and SCR4 and regenerative SCR2 and SCR3 connected in a bridge arrangement. Input terminals 6 and 8 are connected to the anodes of SCR1 and SCR4, respectively, whose cathodes are connected together and then through a center-tapped reactor L1 to the anodes of SCR2 and SCR3 whose cathodes are connected to the respective input terminals. The center tap of reactor L1 is connected through a similar reactor L2 and then through an armature current detecting resistor R2 and armature A of a D.C. shunt motor to the grounded center tap on the secondary winding of transformer PT1.

Field energization for the motor is applied from across the secondary winding of transformer PT1 through conductors 12 and 14 and a full-wave rectifier bridge 16 to shunt field winding F.

From the foregoing, it will be apparent that full-wave rectified energization is applied to the field whereas the armature energization may be varied by varying the firing angle of forward control SCR1 and SCR4. Regenerative control SCR2 and SCR3 control regeneration of energy from the motor armature back into the A.C. supply under overhauling load conditions or the like when the speed or voltage feedback exceeds the reference.

The forward control SCR's are fired under the control of a forward regulator F-REG shown enclosed in broken lines across the midportion of FIGS. 1a and 1b. The regenerative SCR's are fired under the control of a regenerative regulator R-REG shown as a solid line rectangle across the bottom of FIGS. 1a and 1b. Only the forward regulator has been shown in detail since the regenerative regulator is identical thereto and has been shown as a rectangle to avoid complicating the drawings except for some of the magnetic amplifier windings as to their direction of energization which have been shown.

Power to the forward and regenerative regulators is applied from supply terminals AC1 and AC2 through conductors 18 and 20. Power is then applied from conductors 18 and 20 through a voltage stepdown transformer PT2 to forward regulator circuit F-REG, this transformer having a center-tapped secondary winding as shown in FIG. 1a.

In the forward regulator circuit, full-wave rectified voltage is obtained by connecting the opposite sides of the secondary winding of transformer PT2 through two rectifying diodes D1 and D2, respectively, to a common point and then through a voltage dropping resistor R4 to positive conductor 26. The center tap of the secondary winding is connected to negative or common conductor 28. A zener diode ZD is connected to negative or across conductors 26 and 28 to provide clipped half-cycles of voltage across D.C. supply conductors 26 and 28 as a supply voltage for a solid state pulse generating circuit hereinafter described.

A resistor R6 is connected across conductors 26 and 28 to provide an increased minimum firing angle for the forward SCR's as hereinafter described.

To provide a constant D.C. supply for the forward regulator, conductor 26 is connected through a unidirectional blocking diode D3 to a conductor 30, and a filter capacitor C1 is connected across conductors 30 and 28, thereby providing on conductor 30 a constant D.C. voltage of 22 volts or the like. Diode D3 blocks the capacitor voltage from affecting the half-cycles of voltage on conductor 26.

For mixing reference, bias, voltage (speed) feedback and current compensation feedback signals, the forward regulator is provided with a forward magnetic amplifier FMA shown in FIG. 1a. Alternating current power is supplied to this magnetic amplifier from supply conductors 18 and 20 through conductor pair 32 to its power input terminals 34. Since magnetic amplifiers usable herein are well known in the art, the details thereof such as the power windings, rectifiers, etc. have not been shown to avoid complicating the drawings. Magnetic amplifiers of this type are powered by A.C. and provide a D.C. output at the positive and negative output terminals 36 and 38. The control windings that are illustrated are magnetically coupled to the power windings to control the value of the D.C. output as hereinafter more fully described.

The four control windings illustrated within the magnetic amplifier rectangle are the reference winding R, the bias winding B, the voltage or speed feedback winding VFB and the current compensation feedback winding ICFB. The arrow adjacent each winding shows the direction of current flow therethrough and also the function of the winding. That is, an arrow directed up indicates that the winding turns the amplifier toward on or up and an arrow directed down indicates that the winding turns the amplifier toward off or down, in each case, by an amount depending upon its energization.

The reference winding is used to set or adjust the speed of the motor. For this purpose, reference winding R is energized from a speed adjust potentiometer POT1 that is connected across constant D.C. supply conductors 30 and 28.

The movable tap of potentiometer POT1 is connected through a current control resistor R8 and then through reference winding R of the forward control magnetic amplifier and a similar reference winding R' in the regenerative control magnetic amplifier in series to common conductor 28. In this connection, it should be noted that common conductor 28 of the forward regulator is connected at the lower left corner of the latter to a similar common conductor in the regenerative regulator, the latter common conductor being shown as a broken line. As indicated by the arrows, the speed reference windings in the forward and regenerative magnetic amplifiers are energized in opposite directions so that when the forward magnetic amplifier is turned up, the regenerative magnetic amplifier is turned down and vice versa.

For a reversing regulator, the direction of energization of the reference winding may be reversed by a relay or speed adjust potentiometer POT1 may be connected across a plus 22 volts to minus 22 volts supply with common conductor 28 connected to the zero voltage center point of such supply.

The bias winding is used to set the initial operating condition of the magnetic amplifier at or beyond cutoff from which it is turned on by the speed reference winding. For this purpose, the resistor of a bias adjust potentiometer POT2 is connected across conductors 30 and 28 and the movable tap thereof is connected through a current control resistor R10 and bias winding B to common conductor 28. It will be noted that this forward magnetic amplifier bias winding is controlled independently of the similar bias winding in the regenerative regulator that also has its own adjustment.

The voltage or speed feedback winding is used for speed regulation purposes. To this end, a tachometer generator TG is coupled to be driven by the motor armature as indicated by the dotted line. This tachometer generates a D.C. voltage and its positive side is connected through a current control resistor R12 and then down through voltage feedback winding VFB of the forward magnetic amplifier and up through voltage feedback winding VFB' of the regenerative magnetic amplifier to the negative side of the tachometer generator. It will be noted that whereas voltage feedback tends to turn the forward control magnetic amplifier down, it simultaneously tends to turn the regenerative control magnetic amplifier up.

The current compensation feedback winding ICFB, as its name implies, affords introduction of an adjustable compensation into the regulation as hereinafter more fully described. This winding is energized in series with the corresponding winding ICFB' of the regenerative regulator from the current feedback circuit now to be described.

The current feedback circuit is shown at the upper part of FIG. 1b. This circuit comprises an LCR filter including an inductor L3 and a capacitor C2 connected in series across armature resistor R2 and the resistor of a potentiometer POT3 connected across capacitor C2 to provide a smooth D.C. across the capacitor that is proportional to the motor current. The junction between the inductor and capacitor is connected to conductor 40 and the other side of the capacitor is connected to conductor 42. Conductors 40 and 42 are connected to the input terminals of a full-wave rectifier bridge 44. The positive and negative output terminals of rectifier bridge 44 are connected through conductors 46 and 48 to supply a single polarity current feedback signal to both the forward regulator and the regenerative regulator as hereinafter described.

The current feedback circuit also has means for supplying a current compensation feedback signal to the two magnetic amplifiers. For this purpose, current compensation adjust potentiometer POT3 is connected across conductors 40 and 42. The movable tap of this potentiometer is connected through a filter including a resistor R14 and a capacitor C3 to conductor 42. The junction between resistor R14 and capacitor C3 is connected through a current control resistor R16, conductor 50, current compensation feedback winding ICFB of the forward magnetic amplifier and then through the corresponding winding ICFB' in the regenerative magnetic amplifier and conductor 52 to conductor 42. It will be apparent by the arrow that the current compensation feedback winding in the forward control magnetic amplifier is energized in a direction tending to turn the magnetic amplifier more on. The effect of this is to compensate for speed droop at increased loads. The current compensation feedback winding in the regenerative control magnetic amplifier is energized in the opposite direction, that is, tending to turn the associated magnetic amplifier down as hereinafter more fully described.

Returning now to the forward regulator circuit, the output of forward magnetic amplifier FMA is connected through an LCR filter to terminal 54. For this purpose, positive output terminal 36 of the magnetic amplifier is connected through the filter inductor L4 to terminal 54, whereas its negative output terminal 38 is connected to common conductor 28. A filter capacitor C4 and resistor R18 are connected in parallel between terminal 54 and common conductor 28. A forward current reference signal that may vary from 1.3 to 6.5 volts D.C. or the like, for example, is developed at terminal 54 by application of the magnetic amplifier output thereto through the filter.

The forward current reference signal is applied from terminal 54 through an RC filter to a terminal 56 at which point current limit is applied. This RC filter comprises a resistor R20 connected from terminal 54 to terminal 56 and a capacitor C5 connected from terminal 56 to common conductor 28.

At terminal 56, the forward current reference signal voltage is sensed by a current limit circuit. The purpose is to limit this signal voltage if it attempts to go above a predetermined value. For this purpose, a maximum limit resistor R22 and a potentiometer POT4 are connected in series in that order from positive supply conductor 30 to common conductor 28. Terminal 56 is connected through a unidirectional diode D4 to the movable tap of potentiometer POT4. As can be seen, the movable tap may be adjusted to set the value of the blocking voltage on the cathode of diode E4, fixed resistor R22 limiting the maximum value of such voltage. If the forward current reference signal voltage exceeds this set value, diode D4 will conduct current to limit its rise above such set value, thereby functioning as a current limit device.

A compensated lag network is connected to terminal 56. This network comprises a resistor R24 connected from terminal 56 to terminal 58 and a resistor R26 and a capacitor C6 connected in series from terminal 58 to common conductor 28. This network provides some initial voltage at terminal 58 that is equal to the voltage drop across resistor R26. The purpose of this network is to reduce the variation in the motor current from half-cycle to half-cycle.

The current feedback signal is applied to terminal 58 and combined thereat with the forward current reference signal. For this purpose, the positive output terminal of rectifier bridge 44 is connected through conductor 46 to common conductor 28 and the negative output terminal of the rectifier bridge is connected through conductor 48 and a current control resistor R28 to terminal 58. A load resistor R30 of high resistance value is connected between terminal 58 and common conductor 28. It will be seen that the forward current reference signal and the current feedback signal which have opposite polarities are combined in the load resistor, the current feedback signal being subtracted from the forward current reference signal, to provide a resultant signal that is applied to the base of an amplifier transistor T1.

In this amplifier circuit, transistor T1 is of the N-P-N conductivity type. Its collector is supplied with clipped positive half-cycles of voltage from conductor 26 through resistors R32 and R34 in series. Its emitter is connected by a lead network comprising a resistor R36 and a capacitor C7 in parallel to common conductor 28. This lead network is designed to compensate for motor armature characteristics. A unidirectional diode D5 is connected from common conductor 28 to the base of transistor T1 to shunt reverse voltage from the base-emitter circuit of the latter. This amplifier circuit amplifies the forward current reference signal as modified by the current feedback signal and applies it to a pulse generator circuit to control the firing angle of the forward SCR's.

This pulse generator circuit provides firing pulses to the two forward control SCR's in the motor circuit. As will be apparent, this pulse generator circuit comprises an input current control circuit, a trigger voltage developing circuit, and a negative resistance circuit that is triggered on each half-cycle to send firing pulses to the forward control SCR's.

The input current control circuit comprises a transistor T2 having its base connected to the output of the aforementioned amplifier at the junction between collector resistors R32 and R34. This transistor is of the P-N-P conductivity type or the like and its emitter is supplied with clipped positive half-cycles of voltage from conductor 26 through a resistor R38. Its collector is connected to a junction 60 between a resistor R40 and a capacitor C8 of the trigger voltage developing circuit. Resistor R40 is supplied from conductor 26 and capacitor C8 is connected to common conductor 28.

The negative resistance circuit comprises a solid state negative resistance element such as a unijunction transistor UJT. The emitter of this UJT is connected to junction 60. Base B2 thereof is supplied from conductor 26 through resistors R38 and R42. Base B1 thereof is connected through the primary winding of a pulse transformer PT3 to common conductor 28.

Transformer PT3 is provided with two secondary windings connected across the gate-cathode circuits of forward control SCR1 and SCR4, respectively, to apply simultaneous positive firing pulses thereto each time that the UJT is triggered which is once on each full-wave rectified half-cycle.

Use of a full-wave rectifier bridge 44 at the output of the current feedback circuit allows use of a regenerative regulator R-REG that is identical in structure to the forward regulator hereinbefore described, the only difference being in the polarity connections of the regenerative magnetic amplifier windings. It will be apparent that if the current feedback signal were allowed to change polarity on regeneration, then all of the control signal polarities in the regenerative regulator would have to be changed. Use of the single polarity current feedback signal as shown at the upper part of FIG. 1b avoids this. In view of this similarity, the regenerative regulator has been shown as a rectangle for simplicity of illustration with the connections being similar to those of the forward regulator except as shown. Thus, the pulse outputs are connected to regenerative SCR2 and SCR3 through conductors collectively indicated at 62.

OPERATION

The operation of the forward regulator will now be described for minimum firing of SCR1 and SCR4.

When power is applied to supply lines AC1 and AC2, A.C. voltage is applied to the anodes of forward control SCR1 and SCR4. This makes these SCR's ready to pass current to the motor armature when firing pulses are applied to their gates as hereinafter described.

At the same time, power is applied from supply lines AC1 and AC2 through conductors 18 and 20 to forward regulator F-REG and regenerative regulator R-REG. In the forward regulator, this power goes through transformer PT2 and is rectified and clipped to provide clipped positive half-cycles of voltage across conductors 26 and 28. These clipped positive half-cycles are used as supply voltage for the collector-emitter circuit of amplifier transistor T1, the emitter-collector circuit of pulse generator input transistor T2 and the interbase circuit of the pulse generator unijunction transistor UJT.

The pulse generator circuit has been arranged to afford an increased minimum triggering angle. This will cause forward control SCR1 and SCR4 to be fired at this minimum angle on each half-cycle of the A.C. supply. The firing angle can be advanced from this point, but it cannot be retarded.

For this purpose, in FIG. 1a, resistor R6 connected across conductors 26 and 28 functions with the pulse generator circuit to provide this minimum triggering angle. This resistor R6 increases the minimum triggering angle to the required amount. Before resistor R6 was added, the voltage across conductors 26 and 28, and the interbase voltage of the UJT had a wave form substantially as shown by prior art curve Vpa shown in broken lines in FIG. 2 (a) and in solid lines in FIG. 2 (b). This provided the UJT with a peak point triggering voltage substantially as shown by broken line curve Vp in FIG. 2(b) since the peak point triggering voltage of a UJT is a fixed fraction of its interbase voltage. The largest minimum triggering angle that could practically be obtained would be as shown in FIG. 2(b). For this purpose, the value of resistor R40, FIG. 1b, could be selected so that capacitor C8 would charge at the rate shown by curve Vc in FIG. 2(b) and reach the emitter peak point voltage at point 14 causing triggering of the UJT.

By the addition of resistor R6, the minimum triggering angle may be increased as desired. For this purpose, resistor R6 functions with resistor R4 as a voltage divider to change the voltage half-cycle wave shape as shown by solid line curve Vz in FIG. 2(a) and (c). That is, the slope at the trailing end of each half-cycle is reduced. Due to this, the same charging rate on the capacitor causes capacitor voltage curve Vc to intersect the peak point triggering voltage curve Vp at an earlier angle as shown in FIG. 2(c). This is because the reduction in the slope of interbase voltage Vz causes a corresponding reduction in the slope of peak point triggering voltage curve Vp.

For a more detailed description of this increased minimum triggering angle, reference may be had to our aforementioned copending application, Ser. No. 99,166.

From the foregoing, it will be apparent that capacitor C8 will charge on each clipped positive half-cycle to the peak point voltage and will trigger the UJT at the increased minimum triggering angle hereinbefore described. From this minimum angle, the triggering angle of the UJT is advanced by applying a signal to the base of transistor T2. This signal depending upon its value causes a proportionally amplified current to flow through transistor T2 to charge capacitor C8 and thereby to advance the triggering angle.

For this purpose, the motor speed may be increased by turning speed adjust potentiometer POT1 clockwise or in the increase direction. This increases the current flow through reference winding R of the forward magnetic amplifier to increase the amplifier output voltage at terminal 36. This correspondingly increases the current in the reference winding of the regenerative magnetic amplifier but since it is in the opposite direction therethrough, it decreases the output.

This output at terminal 36 is filtered and applied through resistor R20 to terminal 56. This is the forward current reference and appears as a D.C. voltage that may be varied between predetermined values by adjustment of the speed adjust potentiometer. At this point, current limit is applied to the forward current reference signal. For this purpose, potentiometer POT4 applies a blocking voltage to diode D4 and if the forward current reference voltage exceeds such value, current will flow through the diode to limit further increase in the forward current reference signal.

The forward current reference signal is then applied from terminal 56 through resistor R24 to terminal 58 where it is mixed with the current feedback signal coming through resistor R28 and where the compensated lag network hereinbefore described has its effect on the signal to reduce the motor current variation from half-cycle to half-cycle.

The resultant signal is then applied to the base of transistor T1 where it is amplified. Also, the lead network comprising resistor R36 and capacitor C7 acts on the amplified signal to compensate for motor characteristics. The output of amplifier transistor T1 is used to operate the pulse generator. Thus, the voltage drop across resistor R32 puts an emitter-base bias on transistor T2 to turn it on. This causes current to flow from conductor 26 through resistor R38 and the emitter-collector circuit of transistor T2 to capacitor C8. This adds to the current coming through resistor R40 to advance the triggering angle of the UJT. As a result, firing pulses are applied through transformer PT3 to advance the firing angle of SCR1 and SCR4.

This causes the motor to run in the forward direction or if it is already running, to increase its speed. On each half-cycle when the lower end of the secondary of transformer PT1 is positive, SCR1 conducts current. This current flows through the lower half of reactor L1, reactor L2, resistor R2 and armature A to the center tap of the secondary. On alternate half-cycles, when the upper end of the transformer secondary is positive, current flows therefrom through SCR4, the lower half of reactor L1, reactor L2, resistor R2 and armature A to the center tap on the secondary. Thus, on both half-cycles the current flows from the right to left in the armature to run the motor in the forward direction.

Voltage feedback is applied from tachometer TG to the magnetic amplifier. This tachometer is driven by the motor armature as indicated by the dotted line and generates a D.C. voltage that is proportional in value to the motor speed. This voltage is applied to voltage feedback winding VFB of the forward magnetic amplifier and energizes this winding in a direction tending to turn the magnetic amplifier toward off as indicated by the arrow directed down. Consequently, this voltage feedback provides speed regulation for the motor. Thus, if the speed should increase for any reason such as a variation in the load, the voltage feedback increases in value causing a corresponding decrease in the forward current reference signal. This has the effect of retarding the firing angle of forward control SCR1 and SCR4 to reduce the armature voltage and bring the speed back to the selected value. In a similar manner, if the speed should decrease, the voltage feedback decreases causing the magnetic amplifier output to increase. This advances the firing angle of SCR1 and SCR4 to bring the speed back to the desired value. At the same time, a voltage feedback is applied to the corresponding winding of the regenerative regulator to turn the magnetic amplifier therein toward on.

Current compensation feedback is applied from the motor armature circuit to winding ICFB of the forward magnetic amplifier. The purpose of this feedback is to compensate for the increasing drop in the armature as the torque is increased to prevent a droop in the speed-torque characteristic as shown by the broken line in FIG. 3. For this purpose, a voltage proportional to the motor armature current in resistor R2 is filtered and applied across potentiometer POT3. An adjustable part of this voltage is taken from the potentiometer tap, filtered further and applied to winding ICFB in a direction tending to turn the forward magnetic amplifier toward on. The value of this current compensation feedback is selected so to maintain the motor speed substantially constant with increase in torque as indicated by the solid line in FIG. 3.

At the same time, this current compensation feedback signal is applied to the corresponding winding in the regenerative regulator to turn the magnetic amplifier in the off-direction which will reverse to on-direction in connection with regeneration.

In addition to the voltage feedback and current compensation feedback hereinbefore described, as the motor runs current feedback is also applied to the forward and regenerative regulators for current regulation purposes. To this end, a voltage proportional to the motor armature current in resistor R2 is filtered and applied through conductors 40 and 42 to the input terminals of rectifier bridge 44. This rectifier bridge provides a unidirectional output regardless of the direction of the current in resistor R2. The current feedback signal is applied from the positive and negative output terminals of the rectifier bridge through conductors 46 and 48 and resistor R28 across load resistor R30. It will be apparent that this current feedback signal is applied in a direction to subtract from the forward current reference signal appearing across load resistor R30 so that the difference in these two signals will be applied to the base of transistor T1. This current feedback signal is applied at this point, that is, beyond the forward magnetic amplifier where the other feedback signals are applied, to get very fast response to variation in motor load.

The output of transistor T1 is then applied to the base of transistor T2 that controls the current that charges capacitor C8 to advance the firing angle. Each time that this capacitor charges to a voltage equal to the peak point emitter voltage of the UJT, the latter triggers and sends pulses through transformer PT3 to fire SCR1 and SCR4 into conduction. This triggering of the UJT will occur once on each positive half-cycle of the rectified and clipped voltage appearing across conductors 26 and 28, this being the interbase voltage of the UJT.

The interbase voltage of the UJT is applied through emitter resistor R38 of capacitor charging current control transistor T2 to insure recovery of the UJT to non-conducting condition after it has sent the SCR firing pulses. A UJT has a peak point emitter voltage-current characteristic at which it will trigger and provide an output pulse and has a valley point emitter voltage-current characteristic such that when its emitter current is reduced below this valley point, it will suddenly recover to its non-conducting condition. Since the forward current reference signal is continuous, transistor T2 will continue to pass input current after the UJT has triggered. Due to variation in manufacturing, some UJT's might have a lower valley point such that the current through transistor T2 into the emitter thereof might prevent recovery. To insure recovery in these cases, the circuit is arranged to reduce the input current in response to triggering of the UJT. This is done by supplying the interbase voltage through resistor R38. Thus, when the UJT triggers, its interbase current also increases along with the increase in emitter to base B1 current. This interbase current flows through resistor R38 to increase the voltage drop therein. This reduces the emitter-base voltage on transistor T2 to turn it toward off thereby to reduce the emitter current available to the UJT and insure its recovery. For a more detailed description of this recovery circuit, reference may be had to our aforementioned copending application, Ser. No. 98,998.

The regenerative regulator shown as a rectangle at the bottom of FIGS. 1a–b is identical to the forward regulator except that its reference, voltage feedback and current compensation feedback windings are connected for energization at the opposite polarity relative to the corresponding windings in the forward regulator. The reason for this is that it will enable the regenerative regulator to control advancement of the firing angle of regenerative SCR2 and SCR3 as soon as the motor feedback exceeds the reference as hereinafter described.

For this purpose, the bias winding in the regenerative magnetic amplifier is set at an energization point such that with no reference signal, the magnetic amplifier will be biased to cutoff. More specifically, the forward and regenerative magnetic amplifiers are biased so that when one of them is turned slightly on, the other one is off and there is no deadband or the like between the two. That is, as soon as the motor starts overhauling and the feedback signal is greater than the reference signal, the regenerative magnetic amplifier starts turning on. This turning on of the regenerative magnetic amplifier starts advancing the firing angle of SCR2 and SCR3 from the minimum firing angle hereinbefore described. It will be apparent that the regenerative SCR2 and SCR3 will also be fired at a minimum angle on each half-cycle of the supply voltage in the same manner as hereinbefore described in connection with the forward control SCR1 and SCR4.

This minimum firing of the regenerative SCR's is necessary to prevent a "shoot-through" condition, that is, uncontrolled conduction of the SCR that is fired first. This condition is illustrated in FIG. 4. This condition would occur during regeneration when one SCR such as SCR2 is fired and the other SCR3 is not fired. In such case, the fired SCR2 will remain conducting until the current goes to zero. This will result in an A.C. voltage across the motor armature and high uncontrollable armature current as shown in FIG. 4 because the armature counter voltage keeps the current above zero.

The minimum firing of all SCR's on each half-cycle provided herein prevents such uncontrolled conduction. In a similar situation, when SCR2 is fired and the regulator calls for zero firing angle for SCR3, nevertheless SCR3 will be fired at the minimum angle which cannot be reduced by the regulator. This will cause the current to be commutated from one to the next SCR and control is maintained. Thus, assuming that SCR2 has been fired on the first positive half-cycle shown in FIG. 5, and is conducting, the minimum firing of SCR3 will render SCR2 non-conducting. Referring to FIG. 1a, the minimum firing of SCR3 will cause a reverse voltage to be applied to SCR2 to turn it off. This reverse voltage comes about as follows. When SCR2 was fired on regeneration, current flowed from the armature through resistor R2, reactor L2, the upper half of reactor L1, SCR2 and then up through the lower half of the secondary winding of transformer PT1 and its center tap back to the armature. This regenerative current flows during the half-cycle when the upper end of the transformer secondary is positive and the lower end is negative as shown in FIG. 5. Now on the next half-cycle, the lower end of the secondary is positive and its upper end is negative but the aforementioned current continues to flow as shown in FIG. 5. On this half-cycle, SCR3 is minimum fired. Current flows from the armature through resistor R2, reactor L2, the upper half of reactor L1, SCR3, the upper end and center tap of the secondary back to the armature. The voltage at the lower end of the transformer secondary which is positive is applied to the cathode of SCR2 and the voltage at the upper end which is negative is applied through conducting minimum fired SCR3 to the anode of SCR2 to render the latter non-conducting. This is shown near the right side of the second half-cycle in FIG. 5 where SCR3 starts conducting and SCR2 simultaneously stops conducting. In this manner, uncontrolled conduction is prevented and control is maintained throughout the regeneration.

Minimum firing of all of the SCR's including forward control SCR1 and SCR4 and regenerative control SCR2 and SCR3 not only prevents the "shoot-through" condition hereinbefore described but also allows use of the drive over the complete speed-torque range including zero torque as shown in FIG. 6. Such minimum firing of all four SCR's in combination with the T-network of reactors such as L1 and L2 in the motor armature circuit will markedly improve the drive performance by running in continuous current for practically the whole operating range. This may be seen in connection with FIG. 7 which shows a schematic of the motor armature circuit including reactors L1 and L2, SCR1–4 and the two A.C. supply voltages provided by the center tapped secondary winding of power transformer PT1.

Assuming a motoring or forward running condition, SCR1 and SCR4 in FIG. 7 are fired first in the half-cycle and SCR2 and SCR3 are fired thereafter at the minimum firing angle as shown in FIG. 8(a).

Since:

$$i_f(Bmin) \cong \frac{1}{\omega\left(\frac{L1}{4}+L2\right)} \int_x^{Bmin} (e_t - e_m) \, d\omega t + i_f(x)$$

where $e_t$ is the line volts and $e_m$ is the counter volts, and assuming that the loop resistance is equal to zero, the current at minimum firing can be determined by this equation, assuming zero armature loop resistance. The other electrical terms in this equation are defined in FIGS. 7 and 8, or are well known calculus or electrical symbols defined in electrical engineer's handbooks.

When minimum firing occurs as shown in FIG. 8(a), voltage V1 in FIG. 7 goes immediately to zero as shown in FIG. 8(c) because e1 in FIG. 7 is equal to minus e2 and choke L1 has two equal windings, N1 in FIG. 7 being equal to N2, which are connected in series to add flux in the core.

Voltage V1 remains at zero as shown in FIG. 8(c) until either forward current $i_f$ or regenerative current $i_r$ goes to zero. The total time $\omega tc$ is equal to:

$$\omega tc = 2 \, Bmin + \Delta \omega t$$

where $\Delta \omega t$ is directly proportional to speed if the ratio of the two inductors are within a certain range.

To obtain a "more continuous" current, one must aim for volt-seconds that are less negative since negative volt-seconds tend to stop any current flowing in the inductive circuit as shown at the extreme right portion of FIG. 8(b) and (c). Since for zero voltage, zero volt-seconds are available, it is therefore to one's advantage to keep V1 in FIG. 7 at zero since it would be negative without minimum firing of all SCR's as is apparent from FIG. 8.

Since $\Delta \omega t$ shown in FIG. 8(c) is equal to or greater than zero under most operating conditions, the armature current $i_a$ is less discontinuous as shown in FIG. 8(b) by the amount of $\Delta \omega t$. The difference in current is the following:

$$\Delta ia \, (\pi + Bmin + \Delta\omega t) = \frac{1}{\omega L} \int_{\pi + Bmin}^{\pi + Bmin + \Delta\omega t} e(t)\,dt + ia \, (\pi + Bmin)$$

$$= \frac{Emax}{\omega L} \int_{\pi + Bmin}^{\pi + Bmin + \Delta\omega t} \sin \omega t \, d\omega t$$

which is a negative change for $i$(average) being plus.

Continuous current is desirable to obtain better form factor $ff$. Since:

$$ff = AC/DC = RMS/AVE$$

more continuous current results in less motor heating.

Continuous current is also desirable to allow the regulator to be designed for continuous current which also has sufficient gain for diScontinuous current. Aside from the regulator gain there is a current gain equal to di(dc)/dE(dc) which is a constant for continuous current but changing widely for discontinuous current as shown in FIG. 9.

While it is simple to handle a constant gain with a regulator, it is extremely difficult to handle a widely varying gain and still maintain high performance characteristics. In order to maintain stability, the regulator is designed for the high gain situation, that is, constant current. Since its performance is not as good in discontinuous current, it is therefore desirable to keep the current as close as possible to continuous current thereby maintaining a virtually constant gain as shown by the horizontal portion of the graph in FIG. 9. Regulation is inversely proportional to gain.

FIG. 6 shows the improved performance obtained with this invention. The lower curve A is for a prior art single-phase regenerative drive. The middle curve B is for a known three-phase drive. And the upper curve C is for the improved single-phase regenerative drive disclosed herein.

These curves means that it is not possible to control any torque for a given speed which is higher than indicated by the curve. That is the area between curves A and C is the uncontrollable area for a normal single-phase regenerative drive and this is the worse case since it has the largest uncontrollable area. The area between curves B and C is smaller for the three-phase regenerative drive. Such uncontrollable area does not exist for the improved drive disclosed herein as shown by curve C since it can control down to zero torque over the entire speed range.

For the above purposes, reactor L1 must be a large enough inductance to protect the SCR's against cross-the-line conduction. For example, when SCR1 and SCR3 are fired, without inductor L1 there would be a short circuit across the line that could damage the SCR's. Reactor L1 is provided with enough inductance to prevent such damage. The reactor L2 size is determined by making it large enough so that continuous current is reached at a desired operating point. This desired point is determined by such things as motor heating characteristics and maximum tolerable change in the system's gain. As a practical example, reactor L2 may be the same size as reactor L1. This makes it convenient since two similar reactors as to inductance value and ampere turns may be used.

While the system hereinbefore described is effectively adapted to fulfill the objects stated, it is to be understood that the invention is not intended to be confined to the particular preferred embodiment of single-phase full-wave regenerative SCR shunt motor control system disclosed, inasmuch as it is susceptible of various modifications without departing from the scope of the appended claims.

We claim:

1. In a single-phase full-wave rectified regenerative system for controlling power to a D.C. motor to control the speed thereof, the combination comprising:
    an alternating current power supply circuit;
    forward controlled rectifiers for controlling full-wave rectified power from said power supply circuit to the motor;
    regenerative controlled rectifiers for controlling regeneration of power from the motor back to said power supply circuit when the motor counter voltage exceeds the supply voltage;
    said forward and regenerative controlled rectifiers being connected in a bridge circuit having a first pair of terminals connected to opposite sides of said power supply circuit and having a second pair of terminals;
    a T-network of reactors;
    means connecting the lateral reactor of said T-network across said second pair of terminals of the bridge circuit to prevent a short circuit across said power supply when forward and regenerative controlled rectifiers connected to the respective sides of said power supply conduct simultaneously;
    circuit means connecting the other reactor of said T-network and the motor in series to a center tap of said power supply circuit;
    and firing control means for controlling the firing angles of said forward and regenerative controlled rectifiers and including means affording a minimum firing angle therefor.

2. The invention defined in claim 1, wherein said firing control means comprises:
    a pair of regulators including a forward running control regulator for controlling firing of said forward controlled rectifiers and a regenerative control regulator for controlling firing of said regenerative controlled rectifiers;
    and each said regulator comprising:
    a pulse generator for applying firing pulses to the respectively associated controlled rectifiers;
    and means for developing a current reference signal to control advance of the firing angle from a predetermined value comprising:
    signal mixing means for mixing a plurality of control signals to control the value of said current reference signal;
    said firing control means also comprising current feedback means for deriving a current signal proportional to the motor current and for transmitting said signal as a single polarity current feedback signal regardless of the direction of motor current and for subtracting said signal from the current reference signal in each of said regulators;
    and said regulators being identical except for the polarity connections of said control signals to said signal mixing means.

3. The invention defined in claim 1, wherein said firing control means comprises:
    a pair of regulators including a forward running control regulator for controlling firing of said forward controlled rectifiers and a regenerative control regulator for controlling firing of said regenerative controlled rectifiers;
    and each said regulator comprising:
    a pulse generator for applying firing pulses to the respectively associated controlled rectifiers;
    increased minimum firing circuit means for controlling said pulse generator to apply firing pulses at a predetermined minimum firing angle that cannot be decreased by the regulator;
    and means for developing a current reference signal to control advance of the firing angle from said minimum value comprising signal mixing means for mixing a reference signal and a speed feedback signal to control the value of said current reference signal;
    and said firing control means also comprising a current feedback circuit connected to said motor circuit means for developing a single polarity current feedback signal regardless of the polarity of the motor current and for subtracting said current feedback signal from said current reference signal to provide a resultant signal for controlling said pulse generator.

4. The invention defined in claim 3, wherein said signal mixing means also comprises:
    means for mixing a current compensation feedback signal with said reference and speed feedback signals to control the value of said current reference signal.

5. The invention defined in claim 4, wherein:
    said regulators are identical except for the polarities of said signals applied to said signal mixing means.

6. The invention defined in claim 1, wherein:
    said lateral reactor and said other reactor of said T-network are the same size as to inductive capacity.

7. A single-phase full-wave rectified regenerative system for controlling power to a D.C. shunt motor armature to control the motor speed comprising:
    an A.C. power supply means;
    a T-network of reactors including a first reactor connected at one end to the middle of a lateral reactor;
    circuit means connecting the other end of said first reactor through the motor armature in series to an intermediate voltage point on said power supply means;
    a pair of forward controlled rectifiers connected between said power supply means and one end of said lateral reactor for controlling power to the motor armature;
    a pair of regenerative controlled rectifiers connected between the other end of said lateral reactor and said power supply means for controlling regeneration of power from the motor armature back into said power supply means;
    a forward regulator for controlling the firing of said forward controlled rectifiers including means affording a minimum firing angle on each half-cycle that cannot be reduced and means for variably advancing the firing angle from said minimum value to control the motor speed;

and a regenerative regulator for controlling the firing of said regenerative controlled rectifiers including means affording a minimum firing angle on each half-cycle that cannot be reduced and means operable when the motor counter voltage exceeds the supply voltage for advancing the firing angle from said minimum value to control regenerative braking of the motor.

8. The invention defined in claim 7, wherein said system also comprises:

a current detecting device in said motor circuit means;

and a current feedback circuit connected to said current detecting device for applying to each of said regulators the same polarity current feedback signal regardless of the direction of motor current.

9. A single-phase full-wave regenerative SCR system for controlling a D.C. shunt motor comprising:

an A.C. power supply circuit having a center tap;

a T-network of reactors comprising a lateral reactor connected at its middle to one end of a series reactor;

circuit means connecting said series reactor at its other end in series with the motor armature to said center tap on the power supply circuit;

a pair of forward SCR's connected between the respective sides of said power supply circuit and one end of said lateral reactor for controlling forward running power to the motor armature;

a pair of regenerative SCR's connected between the other end of said lateral reactor and the respective sides of said power supply circuit for controlling regeneration of power from the motor armature back into said power supply circuit;

a forward firing control regulator for the forward SCR's and a regenerative firing control regulator for the regenerative SCR'S;

each said regulator comprising means affording a minimum firing angle for the respectively associated SCR's that cannot be reduced by regulation;

each said regulator also comprising means for providing a controllable current reference signal for advancing the firing angle of the respectively associated SCR's from the minimum value;

means common to said regulators effective when the current reference signal in one regulator is being increased for decreasing the current reference signal in the other regulator;

and current feedback means for deriving a signal proportional to motor current from said motor circuit means and for applying a unidirectional current feedback signal to each of said regulators.

10. The invention defined in claim 9, wherein:

said lateral reactor of said T-network has a large enough inductance to protect the SCR's from cross-the-line conduction;

and said series reactor of said T-network has a large enough inductance such that in the aforesaid system that includes said minimum firing angle continuous current condition is reached at a desired point determined by motor heating characteristics and maximum tolerable change of system's gain.

* * * * *